UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

PLASTIC SHOE-BOTTOM FILLER AND METHOD OF MAKING THE SAME.

1,136,980.      Specification of Letters Patent.      Patented Apr. 27, 1915.

No Drawing.      Application filed June 19, 1912. Serial No. 704,552.

*To all whom it may concern:*

Be it known that I, ANDREW THOMA, a citizen of the United States, and resident of Cambridge, in the county of Middlesex and State of Massachusetts, have invented an Improvement in Plastic Shoe-Bottom Fillers and Methods of Making the Same, of which the following description is a specification.

My present invention relates to the manufacture and composition of shoe fillers which have, as set forth in my Patent No. 1,032,312, dated July 9, 1912, a stiff-setting component so as to control and restrain the heat-sensitiveness of the other sticky cementing component. In the aforesaid patent I employed a restraining agent which in one form of the filler acted as a stop or anti-absorbent for the normally penetrative heat-responsive component, and my present invention aims at somewhat the same object by other means.

I have found that in making certain forms of my filler (as, for instance, those specified in Patent 861,555 and 832,002) the fluxing of the sticky component, whether said fluxing be effected by means of heat or by the addition of a solvent, renders said sticky component very penetrating, so that whenever ground leather, cork, or similar absorbent filler-body material is used, the cementing material penetrates or is soaked up or absorbed by said filler-body material and thereby to some extent destroys or reduces the desirable and inherent elastic quality of the filler-body material. Besides, this absorption renders it necessary for me to use a quantity of this sticky material, larger than is needed to effect mere adhesion between the particles. To obviate this, besides introducing various other advantages, I have invented the following method and composition.

The filler of this case is subordinate to and an improvement on my foundation or pioneer filler Patent No. 832,002 of September 25, 1906, above mentioned.

In my copending application, No. 432,083, (now the patent above referred to) I have mentioned the use of a number of restraining agents such as starch paste, gum, dextrin, gluten, glue, casein, albumin, and silica or alkaline silicate in conjunction with the sticky component. In the most complete carrying out of my present method, I use these agents in conjunction with clay or infusorial earth or other inert absorbing powders, which have the effect of preventing to some extent the absorption of the sticky component or components by the porous or fibrous filler-body material. These powders have little or no binding power,—they are merely absorbers and separators. I use in connection with them a suitable cementing medium such as a soluble silicate (potassium or sodium silicate or water-glass or even hydrated silica). These silicates also act, as indicated above, as stiffeners or restraining agents upon the heat-responsiveness of the non-oxidizing wax tailings or other like sticky adhesive components employed and their use is also herein claimed, and forms a part of my present invention, considered with and without said inert powdery material. The sticky component is minutely separated or subdivided by the grains of the inert powdery substances, the latter being at the same time coated and impregnated with the sticky component, so that an addition of water (or other suitable diluents) will form the putty-like or dough-like mass into a free flowing paste, to which I add the setting or stiffening and restraining component. The proportions of sticky component and inert powdery substance necessary to form the same into a putty-like or dough-like mass depends upon the character of the ingredients selected and obtainable, which, as fully explained in my patents aforesaid, vary widely, and therefore I simply take the proper sticky component or composition of my previous patents and mix thereinto the inert absorbing powder or powders until a mass is reached which is putty-like or dough-like as stated. When this condition is reached, the proper proportions have been used. For instance, if wax-tailings is used and it is very soft, a larger proportion of the inert powder is necessary than if a stiffer or firmer variety of wax-tailings is used. This putty-like or dough-like mass I soften into a paste with hot water for instance, until it is free-flowing, i. e. unable to support itself, or becomes like a soft mortar batter. Into this paste I mix a relatively small amount of the stiffening or hard-setting component, the amount required being much less than in my first mentioned patent because the free-flowing character of the wax-tailings has already been largely neutralized by the absorbing powder and hence there is not so much restraining influence required. For instance, instead of four parts of dextrin, I may use two parts, although if more is used or less is used, it does not materially injure the mixture as the wax-tailings remains the dominant force in the filler as a binding medium, as fully explained in my first mentioned patent. The ground leather, cork, or other absorbent filler-body-material is then mixed into the aforesaid composition until the consistency of shoe-filler is reached, i. e. until the mass is stiff or substantially self-supporting, and yet pliable, moldable, coherent, adherent, and waterproof, etc. (the waterproof quality depending of course upon the ingredients used). The degree of plasticity and other characteristics which distinguish a shoe-filler are so well understood and universally recognized in the shoe trade that I do not deem it necessary to amplify this feature further here. The inert powders, having performed their said office of separation and their office of absorption of the otherwise free-flowing heat-responsive component, also constitute a means for reducing the amount of the stiffening or hard-setting component, the resulting combination diminishing to some extent the hardness and brittleness of the mass when dry, besides acting to hinder absorption by the filler-body material of the sticky component as indicated above, or, in other words, they hold in check the penetrating nature of the tailings or other penetrative sticky component. Furthermore, the introduction of the powdery substances into the wax tailings, for instance, produces a composition which may be readily thinned into a paste by water, whereas without the powdery substances the water-repellent nature of the tailings would prevent such thinning. The silicate may in itself constitute the separator and become the restrainer of the sticky component without the presence of the powdery element. The use of the silicate, as just mentioned, is, as already stated herein, set forth in my first mentioned patent, and therefore to this extent the present invention is derived from, and the present application is a continuation of, said patent. The jellylike consistency of the silicate makes it especially suitable to separate a heat-sensitive or responsive sticky component such as wax tailings into minute parts, and acts as a convenient medium for spreading the molecules of the sticky component among the cork granules and thereby holding in check the penetrative tendency of the sticky component and rendering it likewise less responsive to heat when the filler is set in the shoe. The restraining agent which I prefer in the present relation is an alkaline silicate. I may supplement this, in part, at least, by one or more of the others referred to in my former application and indicated above. The silicates thus employed are practically waterproof under conditions of use, and render the shoe-filler firm and elastic. I may, if I choose, add to the material some substance which will react with the silicate and will produce thereby a harder, insoluble silicate. Such a substance is lime or a lime salt, which will precipitate from the alkaline silicate, in the mass, an insoluble lime silicate harder than the alkaline silicate.

The filler is preferably made and packaged as explained in my aforesaid application Serial No. 432,083, the ground cork or other filler-body material being preferably mixed with the binder and sold in this shape as an article of manufacture. I may also package this compound without the filler-body material, thus enabling the shoe manufacturer to mix in his own leather scrap or other filler-body material. Or, I may compound the filler in a nearly dry condition and package it for use in the trade, the manufacturer to add water or steam vapor as required. The silicate should not be dried to the condition of a powder in such a package, but merely to a stiff condition. If the drying is carried further than this, solution with pure water is attended with some delay and difficulty, and in any case, solution of the silicate is made easier by the addition to the water used for solution, of a little alkali, either a fixed alkali as sodium hydrate, or ammonia.

While I have indicated mineral absorbent material, such as china clay or infusorial earth, as desirable, I do not wish to be confined to these, as any substance which is inert and which will absorb the sticky binder may be used, and this includes among others, such substances as talc, whiting, magnesia, starch, dextrin, bone dust, fullers' earth, lime, asbestos, pulverized slate, the oxids or carbonates of various metals, powdered hardwood dust, etc., as mentioned in my copending application Serial No. 705,135, now Patent No. 1,121,688, dated December 22, 1914, which contains the generic claims to which the present case is subordinate and where the generic invention is further elaborated.

No particular proportions are recited. The invention does not depend upon formulas.

As already stated, the object is to make a shoe-filler of the same general characteristics as my patented fillers, and therefore substantially the same proportions of the old ingredients will be used (except as herein already stated), together with only just enough of the new ingredients for the desired variation, while still leaving the filler as a filler, i. e. having the pliability, moldability, adhesiveness, cohesiveness, resiliency, substantial consistency, etc., which are fully set forth in my patents and commonly understood in the practical art among shoemakers as distinguishing and constituting a shoe-bottom filler. The inert materials may vary and the silicate accordingly, and the proportions will of course depend upon the particular formula of filler which is being employed, among the many formulas of my aforesaid patents. For instance, when making a filler of the character set forth in the dextrin formula of my first-mentioned patent, I would use simply enough of the inert absorbent powder to neutralize the penetrative quality of the gummy binding material, and of course this will depend upon the kind of gummy material. Wax-tailings, for instance, is very penetrative, especially the soft sticky varieties, and this penetration is increased by the fact that it has to be mixed by the aid of heat. The maker of the filler determines the amount of inert powdery material to be used by mixing it in until it gets to a putty-like or doughy consistency so as to cease to tend to penetrate the filler-body. The filler-body is preferably of a fibrous nature such as ground leather in the filler of the present application (although other body-materials may be used), the ground leather being preferable because of its shredded or filamentous ragged-like character which forms a superior mat for the sticky but yet non-penetrative mushy wax-tailings and clay mixture. This mixture is given its complete union with the ground leather by the water, which makes the proper mastic condition for the complete assembling of the filler. The amount of body-material or ground leather used will likewise vary according to the kind of gummy binding material. As already stated, the granulated or ground body-material is mixed in until the mass reaches the character above set forth as characterizing shoe-filler, and in thus mixing the ingredients, the amount of dextrin, as already stated will be less than it would be without the inert powder because the latter has performed the office of neutralizing the penetrativeness and fluidity of the tailings, so that the dextrin is depended upon only or mainly for stiff-setting the laid filler. The advantage of the water or liquid is to carry the otherwise relatively stiff or sluggish mixture more readily and intimately into and among the leather particles in a more finely disseminated or sub-divided pasty condition or state. Each small particle of the inert material is carrying along with it a small particle or thin coating of the wax-tailings, and the water simply permits these particles to move freely and be distributed among the ragged or fuzzy mass of shredded leather. The silicate takes the place of the dextrin. Also, as mentioned, I may substitute the silicate for both the dextrin and the inert powder, and, in this case, the same rule applies, viz. the soft tailings for instance and the syrup-like silicate are mixed together in the presence of heat until they become properly mushy for receiving the filler body-material of ground leather or the like, as already explained.

Having described my invention, what I claim as new and desire to secure by Letters Patent is:

1. The method of making shoe-bottom filler, which consists in mixing with wax tailings, a powdered inert material and a dissolved silicate, and then admixing with said mixture a granular filler-body material to a doughy consistency.

2. The method of making shoe-bottom filler, which consists in mixing with a heat-sensitive sticky binder, a powdered inert mineral thickening material, adding an alkaline silicate in solution, mixing, adding filler-body material, and mixing to a dough-like consistency.

3. The method of making shoe-bottom filler, which consists in mixing with a heat-sensitive sticky adhesive binder, and a solution of an alkaline silicate, a material reacting with said silicate to produce a harder, insoluble silicate, and then admixing a comminuted filler-body material.

4. The method of making shoe-bottom filler, which consists in first mixing with a heat-sensitive sticky adhesive binder, a soluble silicate, and then admixing a comminuted fibrous filler-body material to a doughy consistency.

5. The method of making a material for use in filling the bottoms of shoes, which consists in mixing with a heat-sensitive sticky binder, a powdery inert absorbent material in amount sufficient to make a putty-like mass, adding a soluble silicate, and mixing.

6. The method of making a material for use in filling the bottoms of shoes, which consists in mixing with a heat-sensitive sticky binder, an inert powdery absorbent material, adding a soluble silicate, mixing, adding filler-body material, and mixing to a dough-like consistency.

7. The method of making shoe-bottom filler, which consists in mixing with a permanently sticky binder, an inert powdery separator and absorbent, adding a soluble silicate, mixing thoroughly to a thin pasty fluid, adding shoe-filler body-material in a comminuted condition, and mixing to a dough-like mass.

8. The method of making a material for use in filling the bottoms of shoes, which consists in mixing with a heat-sensitive sticky binder, a powdery inert absorbent material, adding a soluble mineral agent capable of restraining the binder, when once set, from its otherwise normal tendency to soften under heat, and mixing thoroughly to a doughy condition.

9. The method of making shoe-bottom filling material, which consists in mixing with a heat-sensitive sticky binder, an agent consisting mainly of an alkaline silicate adapted to restrain the binder when once set against the melting influence of low heat, and mixing in a comminuted fibrous filler-body material.

10. A shoe-filler for filling the bottoms of shoes, consisting of a moldable, coherent mass pliable and non-shifting when set, having a doughy consistency before setting, and comprising in its composition a sticky binder rendered fluid by low heat, an inert powdered material, with a tendency to absorb said sticky binder, in amount to control the fluidity of said binder, and a soluble silicate.

11. A shoe-filler for filling the bottoms of shoes, consisting of a moldable, coherent mass pliable and non-shifting when set, having a doughy consistency before setting, and comprising in its composition a comminuted fibrous shoe-filler body-material, and a soluble silicate.

12. A shoe-filler for filling the bottoms of shoes, consisting of a moldable, coherent mass pliable and non-shifting when set, having a doughy consistency before setting, and comprising in its composition a comminuted fibrous shoe-filler body-material, a soluble silicate, and an inert powder.

13. A composition for filling the bottoms of shoes, which consists of a heat-sensitive sticky binder, an inert powdered absorbent material, a soluble silicate, and an elastic porous comminuted filler-body material, united into a permanently pliable, cohesive body.

14. A shoe-bottom filling composition, comprising wax tailings, powdered clay, a dissolved alkaline silicate, and comminuted filler-body material.

15. A shoe-bottom filling composition, comprising a sticky heat-sensitive binding material, a powdered inert absorbent material, an alkaline silicate, a substance adapted to react with said silicate, so as to produce a harder, insoluble silicate, and a porous filler-body material, all united in a permanently pliable mass.

16. A shoe-bottom filling composition, comprising a sticky, heat-sensitive, binding material, meltable at low heat but above the normal temperature of a shoe in use, an inert material having a tendency to absorb said sticky material, an alkaline silicate, and an agent adapted to react with said silicate, so as to produce a harder, insoluble silicate, and yet leave the filler mass permanently pliable.

17. A shoe-bottom filling composition, comprising a heat sensitive binder, meltable at a low heat slightly less than would be injurious to leather, an alkaline silicate, and a powdered inert absorbent material adapted to combine with said silicate to render the latter insoluble, and having a tendency to absorb and subdivide said adhesive, the whole being permanently pliable.

18. A shoe-bottom filling composition, comprising wax tailings, a powdered separator therefor, a dissolved alkaline silicate, and a porous comminuted filler-body material, the whole being mixed thoroughly together and having about the consistency of dough.

19. A shoe-bottom filling composition, comprising wax tailings, a powdered diluent therefor, a soluble mineral agent acting to restrain the tailings from the normal responsiveness to heat when the composition has once set, and a porous filler-body material, the whole being mixed thoroughly together and having about the consistency of dough.

20. A shoe-bottom filler, comprising a sticky, normally heat-sensitive binding material, meltable at low heat, an inert material having a tendency to absorb said binding material, a soluble mineral agent, acting to restrain said binding material from its normal heat sensitiveness when the composition has once set, and a comminuted resilient shoe-filler body-material.

21. A shoe-bottom filler, comprising wax tailings, powdered clay, an agent acting to restrain the tailings against responding to low heat when the filler has once set, and comminuted filler-body material.

22. A shoe-bottom filler, comprising a heat-sensitive, sticky binder, an inert powdered material having a tendency to absorb said sticky binder, and a soluble mineral setting agent, united into a permanently pliable plastic, self-sustaining body.

23. A shoe-bottom filler comprising a sticky non-oxidizing binder, a powdered inert absorbent and separating material acting to absorb and hold in separated suspension said binder in minute subdivision, a soluble mineral setting agent, and a comminuted shoe-filler body material all united into a mass of doughy consistency before setting.

24. A shoe-bottom filler, comprising a comminuted shoe-filler body-material, a stiffener consisting at least in part of a soluble mineral, and a permanently flexible, normally heat-respondent, sticky binder, meltable at low heat and capable of being subdivided in suspension throughout the mass by the mixture with said soluble mineral, united in a permanently pliable sticky mass.

In testimony whereof I have signed my name to this specification, in the presence of two subscribing witnesses.

ANDREW THOMA.

Witnesses:
JAMES R. HODDER,
EDWARD MAXWELL.